United States Patent [19]

Burke

[11] Patent Number: 5,067,314
[45] Date of Patent: Nov. 26, 1991

[54] HARVESTER FOR GRAPES

[75] Inventor: Desmond C. Burke, Mildura, Australia

[73] Assignee: U.R. Engineering Pty., Ltd., Mildura, Australia

[21] Appl. No.: 687,201

[22] Filed: Apr. 18, 1991

Related U.S. Application Data

[63] Continuation of Ser. No. 552,429, Jul. 13, 1990, abandoned, which is a continuation of Ser. No. 361,173, Jun. 5, 1989, abandoned.

[51] Int. Cl.$^5$ .............................................. A01D 46/00
[52] U.S. Cl. .......................................... 56/330; 56/331
[58] Field of Search ...................... 56/330, 331, 328.1, 56/113, 114, 126, 127

[56] References Cited

U.S. PATENT DOCUMENTS

| | | | |
|---|---|---|---|
| 3,473,311 | 1/1968 | Fox | 56/330 |
| 3,889,454 | 6/1975 | Bruel | 56/330 |
| 4,063,406 | 12/1977 | Burton | 56/330 |
| 4,771,594 | 9/1988 | Deux et al. | 56/330 |

Primary Examiner—Thuy M. Bui
Attorney, Agent, or Firm—Flehr, Hohbach, Test, Albritton & Herbert

[57] ABSTRACT

A grape harvesting machine comprising a mobile carriage having a picking head operatively connected thereto. The picking head including a main frame connected to said carriage. A plurality of picking rods which are movable back and forth are arranged in banks disposed on opposite sides of the main frame. The main frame is mounted so as to be suspended from the carriage and freely pivotable relative thereto. The banks of picking rods can adopt one operating mode in which the banks of picking rods are freely pivotable about the pivot axes so that, in use, the banks can change position as the harvester moves along the rows of vines. The banks of picking rods can adopt a further operating mode in which they can be secured in selected operating positions including a generally vertical position or selected inclined positions.

11 Claims, 3 Drawing Sheets

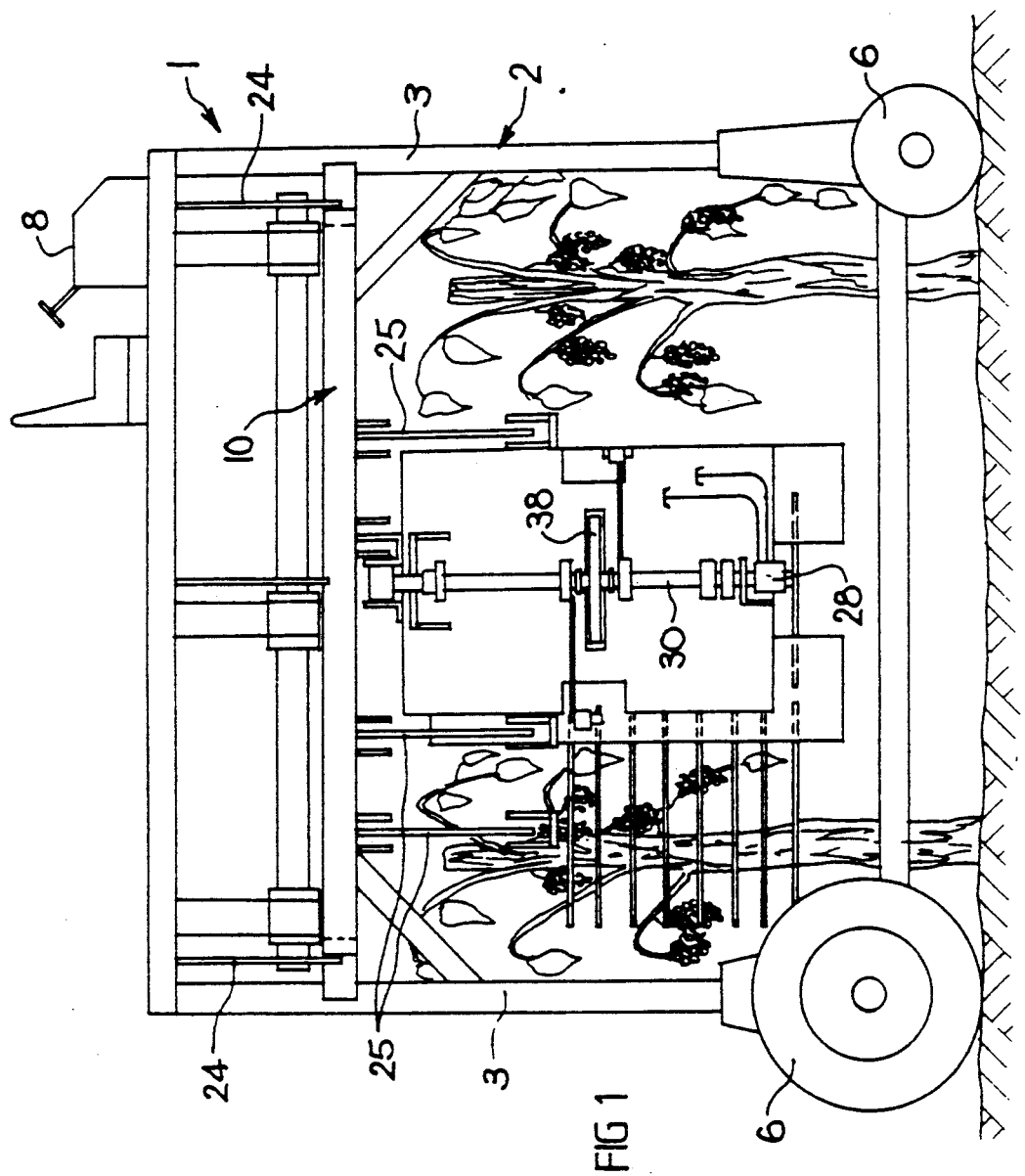

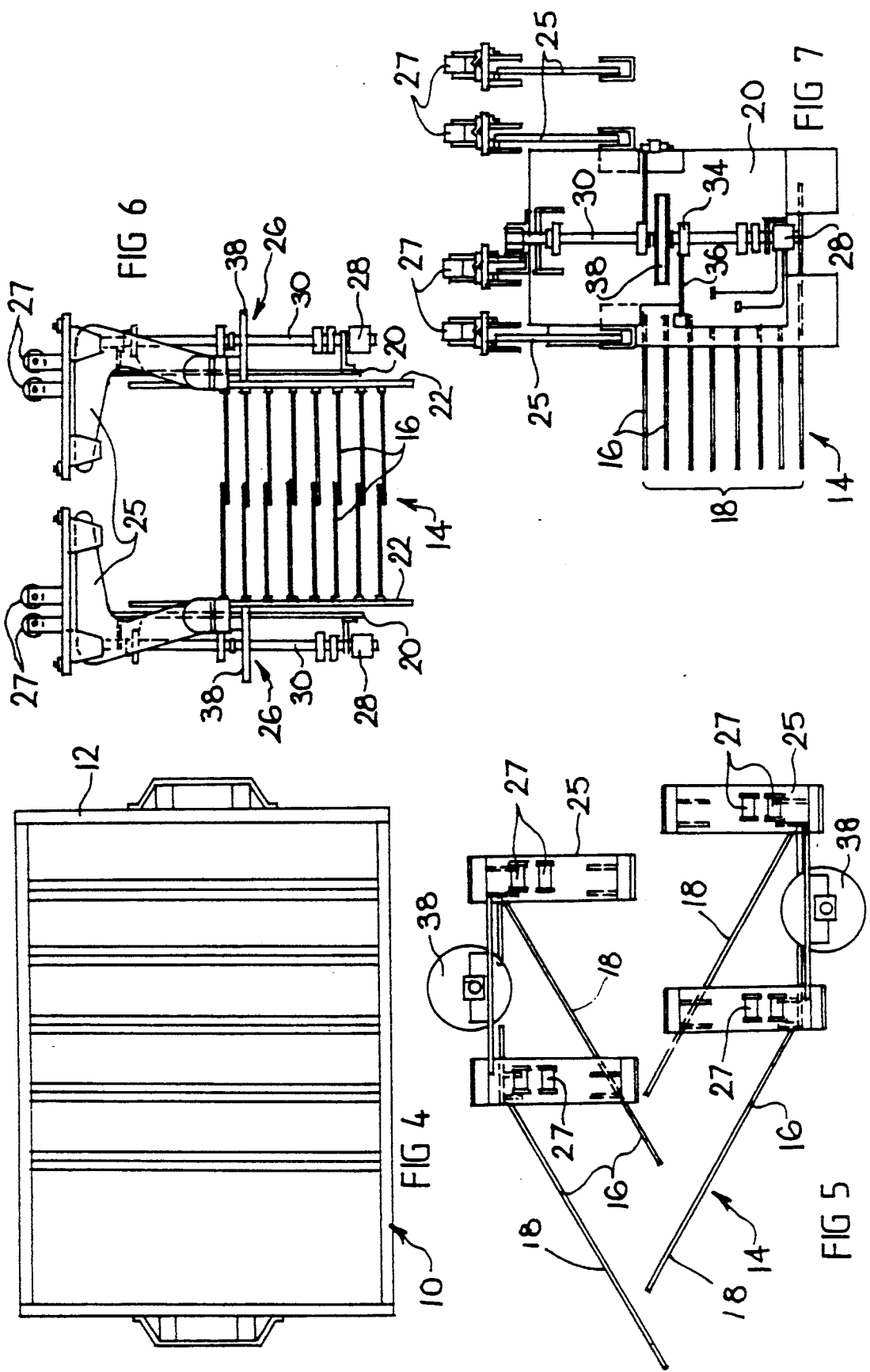

HARVESTER FOR GRAPES

This is a continuation of application Ser. No. 07/552,429 filed July 13, 1990, abandoned, which is a continuation application of Ser. No. 07/361,173 filed June 5, 1989, which is now abandoned.

BACKGROUND OF THE INVENTION

This invention relates to harvesting machines for grapes and the like.

Grape vines are generally grown on three types of trellis. The first is a vertical wire trellis which comprises a series of upright posts arranged in spaced apart relation in a row with wires extending between the uprights along the row. The second and third types of trellis comprise a series of upright posts arranged in spaced apart relation in a row each post including a generally horizontal cross arm thereon. Wires are attached at the end of each cross arm the wires extending along the row.

Mechanical harvesting machines for harvesting grapes grown on trellis of the type described above are known. One type of harvesting machine currently in use includes a machine which can utilize different types of picking heads which comprise a series of agitator rods and which are mounted so that as the machine travels along a row of vines, the agitator rods shake or beat the fruit or foliage or trellis to which the vines are grown so that the fruit will fall from the vines. Whilst mechanical harvesting machines have significantly increased the speed of harvesting, they suffer from several disadvantages. For example, known machines of this type find difficulty in removing all of the fruit particularly where the fruit on the vines grows near the inner area of the trellis. Furthermore, problems are encountered where the density of foliage varies along the row of vines. For example, where the density increases the agitator rods have more difficulty in operating in the required manner. The machine can also be susceptible to driver error, where the driver strays from the optimum line of travel along the row.

The picking heads currently in use have difficulty in being capable of efficiently removing grapes from all three trellis arrangements described above. It is often necessary to change the type of picking head to suit the trellis arrangement. This is time consuming and costly.

It is the object of the present invention to provide an improved harvester which alleviates one or more of the aforementioned disadvantages.

SUMMARY OF THE INVENTION

In its basic form, the harvester of the present invention comprises a mobile carriage with a picking head operatively connected to the mobile carriage. The picking head includes a main frame which is operatively connected to the carriage, the main frame having an axis which extends generally in the same direction as the normal line of travel of the harvester, and picking means operatively connected to the main frame. The picking means comprises a plurality of picking rods which are movable back and forth laterally of the axis of the main frame. The picking rods are arranged in banks with at least one bank being disposed to one side of the main frame axis, and at least another of the banks being disposed on the other side of the main frame axis. The rods in each bank are arranged side by side in spaced apart relation with respect to a longitudinal axis extending between one end of the bank and the other end.

According to one aspect of the present invention, the main frame of the picking head is mounted so as to be suspended from the carriage and freely pivotable relative thereto about an axis which extends generally parallel to the main frame axis. This arrangement has the advantage that when in use, the freely pivotal suspension of the picking head will enable automatic compensation of the load on the picking rods in each bank should the harvester veer off-line during movement along a row of vines.

According to another aspect of the present invention, the banks of picking rods are pivotally mounted with respect to the main frame of the picking head about pivot axes which extend generally parallel to the main frame axis so that the banks of picking rods can adopt an operating mode in which the banks of picking rods are freely pivotable about the pivot axes so that, in use, the banks can change position as the harvester moves along the row of vines. The freely pivotal mounting of the banks of picking rods tends to compensate for variations in density of foliage along the row of vines.

According to yet another aspect of the present invention, the pivotally mounted banks of picking rods are arranged to adopt a further operating mode in which the banks can be secured in selected operating positions including a generally vertical position or positions where one end of each bank is disposed more towards or away from the central axis of the frame than the other end. Thus, by securing the banks of picking rods at an angle to the central axis the inner area of the vines becomes more accessible to the picking rods.

Preferably the picking rods of each bank are mounted towards one end portion thereof the other end portion projecting generally rearwardly with respect to the normal direction of travel of the machine. Preferably the lateral movement of the rods comprises a pivotal movement about the longitudinal axis of the bank at the aforementioned one end portion so that the rods can move towards and away from the main frame axis.

Preferably one end of each bank of picking rods defines an upper end and the other end defines a lower end. In the particular operating mode where each bank of picking rods is freely pivotable about its associated pivot axis biasing means may be provided so that the longitudinal axis of each bank is inclined to the vertical with the lower end of each bank being disposed inwardly towards the main frame axis with respect to its associated upper end. The biasing means may comprise a member which when the bank is suspended from its pivot axis causes it to adopt the operating position referred to above.

Preferably damping means is provided to inhibit movement from the operating position referred to above. Such damping may be effected by rotation of the biasing member so as to thereby make it difficult to move the bank as a result of the forces created due to rotation of the member.

The harvester of the invention may take any suitable form. For example, the carriage may comprise a frame work of structural members having upright sections and a straddling section arranged so that, when in use, the carriage can straddle a row of vines. Ground engaging wheels may be provided on the upright section upon which the carriage can travel. The carriage may be self-powered or adapted to be towed by a vehicle such as a tractor.

Preferably the main frame of the picking head is disposed adjacent to the straddling section of the carriage and is pivotally mounted to the carriage. The main frame of the picking head may be generally rectangular in form, and connected to the carriage by means of a pair of pivotally mounted arms one end of which is pivotally mounted to the carriage and the other which is pivotally mounted to the main frame of the picking head. The arms may be adapted to be raised and lowered with respect to the carriage by means of an actuator such as for example, an hydraulic/piston cylinder.

In one form the picking head may include a support assembly for carrying the banks of picking means the support assembly being operatively connected to the main frame. Preferably the support assembly comprises a plurality of support units at least one support unit being disposed on each side of the axis of the main frame.

Preferably each support unit comprises a backing member having a longitudinal axis and one or more carriers mounted on the backing member, each carrier having one of the banks of picking means secured thereto. The carriers are operatively connected to the backing member so as to be pivotable about an axis defining the longitudinal axis of the bank this axis extending generally parallel to the longitudinal axis of the backing member.

Preferably mounting members operatively connect the backing member to the main frame. The mounting members may be L-shaped with a free end of one of the arms of each member projecting downwardly with the pivotal mounting for the backing member being disposed at that free end. Preferably rollers are provided on the other arm of the L-shaped member so that it can move along the main frame so that the picking banks on either side of the main frame axis can be moved towards or away from each other. Preferably the banks of picking rods are staggered in the direction of the normal line of travel of the harvester.

Drive means may be provided for causing pivotal movement of the picking rods. Such drive means may comprise a motor operatively connected to the backing plate and a drive shaft having a transmission mechanism interconnecting the drive shaft and the carrier plate. The transmission mechanism may comprise an eccentric mounted on the drive shaft and a coupling link operatively connecting the eccentric with the plate to cause the reciprocating movement of picking rods on each banks.

The biasing means and damping means is preferably in the form of a fly wheel on the drive shaft this fly wheel being positioned to cause the support assemblies to adopt the operating position referred to earlier.

In the further operating mode referred to earlier, means may be provided to secure the banks of picking rods in a position where the longitudinal axis of the bank is inclined with respect to the vertical. Thus, in this operating mode the banks of picking.rods are held in a selected position rather than being freely pivotable. Such means may be in the form of a turn buckle or other suitable device.

BRIEF DESCRIPTION OF THE DRAWINGS

Preferred embodiments o f the invention will hereinafter be described with reference to the accompanying drawings and in those drawings:

FIG. 1 is a schematic side elevation of a harvester according to the present invention;

FIG. 4 is a plan view of the main frame of the picking head;

FIG. 5 is a plan view of picking means support assembly member;

FIG. 6 is an end view of one of the picking means support assembly; and

FIG. 7 is a side elevation of the support assembly shown in FIGS. 5 and 6.

DETAILED DESCRIPTION OF THE PREFERRED EMBODIMENTS

Figure 3:
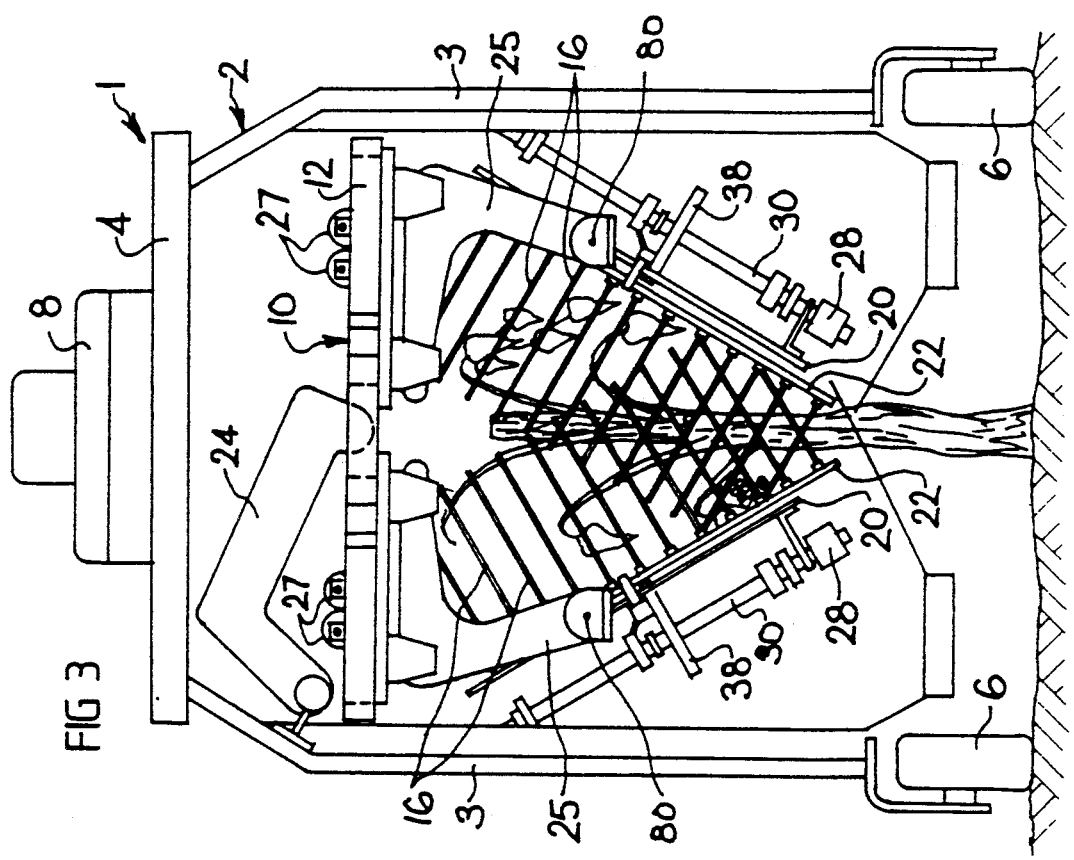
FIG. 3 is a similar view to that of FIG. 2 with the picking means support assemblies shown in one of its operating positions.

Referring to FIGS. 1-7, the harvester generally indicated at 1 comprises a mobile carriage 2 formed from a framework of structural members comprising upright sections 3 and a straddling section 4 arranged so that the carriage can straddle a row of vines. The carriage further includes ground engaging wheels 6 and in the form shown is self-powered having a driving cabin 8 at an upper section thereof. Alternatively the harvester may be adapted to be towed by a tractor or other vehicle.

The picking head generally indicated at 10 includes a main frame 12 which is operatively connected to the carriage 2. The mainframe 12 has a central or main axis which extends generally in the direction of the normal line of travel of the harvester. The picking head 10 includes picking means 14 having a plurality of picking rods 16 which are moveable back and forth laterally of the axis of the main frame. The picking rods 16 are arranged in banks 18 (see FIG. 5) disposed on both sides of the axis of the main frame. The rods 16 in each bank 18 are arranged side by side in spaced apart relation.

Figure 2:
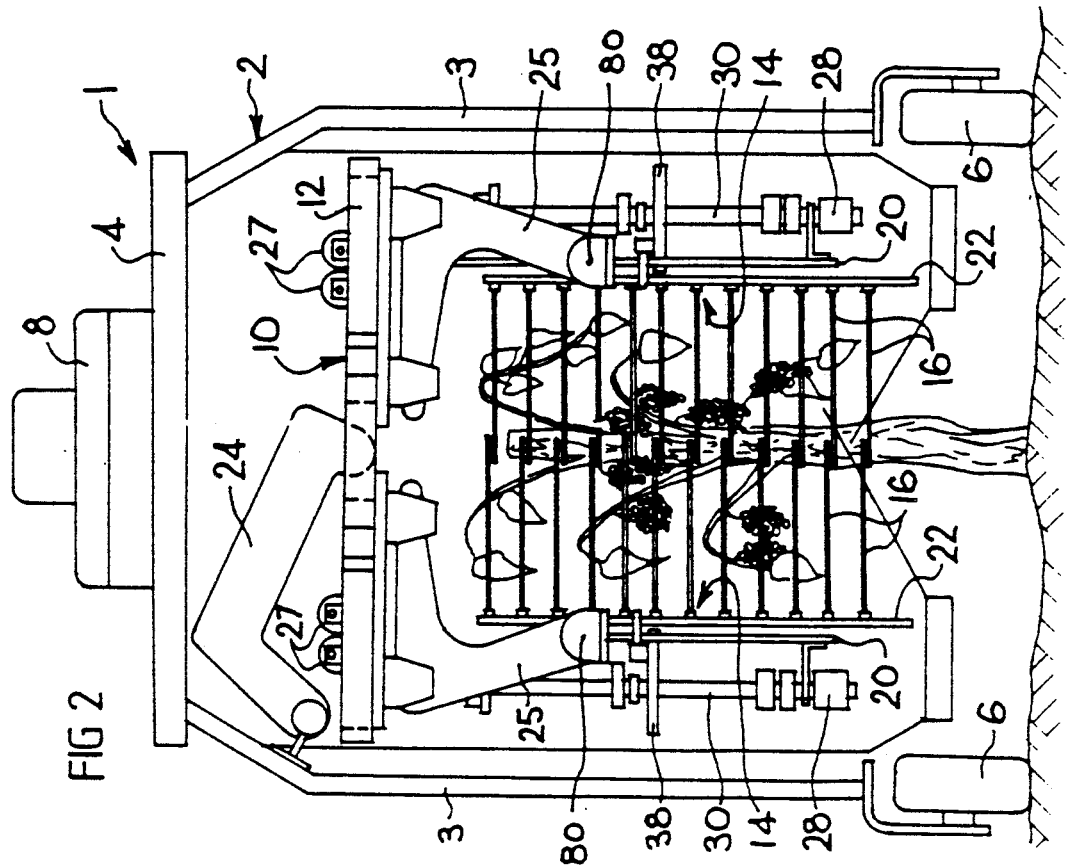
FIG. 2 is a schematic end elevation of the harvester shown in FIG. 1.

As best seen in FIGS. 2 and 3, the main frame 12 of the picking head 10 is mounted so as to be suspended from the carriage 2 via arms 24 and is freely pivotable relative thereto about an axis which extends generally parallel to the main frame axis. This arrangement has the advantage that when in use, the freely pivotal suspension of the picking head will enable compensation should the harvester veer off-line during movement along a row of vines.

As shown in FIGS. 2 and 3, the banks 18 of picking rods 16 are pivotally mounted with respect to the main frame 12 of the picking head 10 about pivot axes 80 which extend generally parallel to the main frame axis so that the banks 18 of picking rods 16 can adopt an operating mode in which the banks of picking rods are freely pivotable about the pivot axes 80 so that, in use, the banks 18 can change position as the harvester moves along the row of vines. The freely pivotal mounting of the banks 18 of picking rods 16 tends to compensate for variations in density of foliage along the row of vines. In this operating position, it is preferable that the banks 18 of picking rods when in a freely suspended position are slightly inclined with their lower ends being disposed more inwardly than their upper ends.

The pivotally mounted banks 18 of picking rods 16 can also be arranged to adopt a further operating mode in which the banks 18 are secured in selected operating position with the banks being disposed for example, vertically as shown in FIG. 2 or with one end of each bank 18 being disposed more towards or away from the central axis of the main frame 12 than the other end so that the banks are inclined as shown in FIG. 3. Thus, for example, by securing the banks of picking rods at an angle to the central axis the inner area of the vines become more accessible to the picking rods.

As shown, the picking rods 16 of each bank 18 are mounted towards one end portion thereof the other end portion projecting generally rearwardly with respect to the normal direction of travel of the machine, and mounted for pivotal movement about a longitudinal axis so that the banks 18 or rods 16 on opposite sides can move towards and away from the main frame axis.

As shown, the main frame 12 of the picking head 10 is disposed adjacent to the straddling section 4 of the carriage 2. As shown in FIGS. 2, 5, 3 and 4, the main frame 12 of the picking head 10 is generally rectangular in form, and connected to the carriage by means of a pair of pivotally mounted arms 24 one end of which is pivotally mounted to the main frame 12 of the picking head. The arms 24 are adapted to be raised and lowered with respect to the carriage means of an actuator such as for example, an hydraulic/piston cylinder (not shown).

As shown in FIGS. 6 and 7, the picking head 10 comprises a plurality of support assemblies for carrying the banks of picking rods each support assembly being operatively connected to the main frame. Each support assembly comprises a support unit, the support units being disposed on each side of the axis of the main frame.

Each support unit comprises a backing member 20 in the form of a backing plate having a longitudinal axis and a carrier 22 is mounted on the backing member 20 each carrier 22 having one of the banks of picking rods 16 secured thereto. The carriers 22 are operatively connected to the backing member 20 so as to be pivotable about an axis extending generally parallel to the longitudinal axis of the backing member.

Mounting members in the form of L-shaped arms 25 are provided with a free end of one of the arms of each member projecting downwardly with the pivotal mounting of the banking member 20 being disposed at that free end. Rollers 27 are provided on the other arm of the L-shaped member 25 so that it can move along the main frame 12 so that the banks 18 on the opposite sides of the mainframe axis can be moved towards or away from each other. Preferably the banks of picking rods are staggered in the direction of the normal line of travel of the harvester as shown in FIG. 5.

Drive means 26 is provided for causing pivotal movement of the picking rods and comprises a motor 28 a drive shaft 30 and a transmission mechanism 32 which includes an eccentric 34 and a coupling link mechanism 36, these integers being mounted to the backing plate 20.

Biasing means and damping means are provided and as shown comprise a fly wheel 38 on drive shaft 30 this fly wheel 38 being positioned to cause the support assemblies to adopt the position referred to earlier when discussing the first mentioned operating mode.

Rotation of the fly wheel tends to hold the banks 18 in the selected freely suspended position.

Finally, it is to be understood that various alterations, modifications and/or additions may be incorporated into the various constructions and arrangements of parts without departing from the spirit and ambit of the invention. Additionally, the invention is not to be limited only to the described embodiments, but rather only by the appended claims.

What is claimed is:

1. A harvesting machine suitable for grapes and like crops, the harvesting machine comprising a mobile carriage having a picking head operatively connected thereto, said picking head including a main frame which is operatively connected to said carriage, said main frame having an axis which extends generally in the same direction as the normal line of travel of the harvesting machine, picking means operatively connected to said main frame, said picking means comprising a plurality of picking rods which are movable back and forth laterally of said axis of said main frame, said picking rods being arranged in banks with at least one bank being disposed on one side of said main frame axis, and at least one other of said banks being disposed on the other side of said main frame axis, said rods in each bank being arranged side by side in spaced apart in relation to a longitudinal axis extending between one end of the bank to the other end, said banks of picking rods being pivotally mounted with respect to said main frame of said picking head about pivot axes which extend generally parallel to the main frame axis so that said banks of picking rods can adopt an operating mode in which the banks of picking rods are freely pivotable about the pivot axes so that, in use, the banks can change position as the harvester moves along the row of vines and wherein said main frame of said picking head is mounted so as to be suspended from said carriage and freely pivotable relative thereto about an axis which extends generally parallel to the main frame axis.

2. A harvesting machine according to claim 1, wherein said picking rods of each bank are mounted towards one end portion thereof the other end portion projecting generally rearwardly with respect to the normal direction of travel of the machine.

3. A harvesting machine according to claim 2 wherein said lateral movement of said picking rods comprises a pivotal movement about said longitudinal axis of said bank at said one end portion so that said rods can move towards and away form said main frame axis.

4. A harvesting machine according to claim 3 wherein one end of each said bank of picking rods defines an upper end and the other end defines a lower end, and when in said operating mode each bank of picking rods is freely pivotable about its associated pivot axis, and further including biasing means so that the longitudinal axis of each bank is inclined to the vertical with the lower end of each bank being disposed inwardly towards the main frame axis with respect to the upper end thereof.

5. A harvesting machine according to claim 4 wherein the pivot axis of each bank of picking rods is disposed between the ends of the bank so that a portion of the bank of picking rods extends to one side of the pivot axis and another portion of the bank of picking rods extends to the other side of the pivot axis.

6. A harvesting machine according to claim 5 wherein said biasing means comprises a biasing member which when said bank is suspended from its pivot axis causes it to adopt said operating position.

7. A harvesting machine according to claim 6 further including damping means for inhibiting movement from said operating position.

8. A harvesting machine according to claim 7 wherein said damping means is defined by said biasing member which is mounted for rotation so as to thereby make it difficult to move the bank as a result of the forces created due to rotation of the member.

9. A harvesting machine according to claim 7 wherein said biasing means and damping means comprises a fly wheel on the drive shaft said fly wheel being positioned to cause the support assemblies to adopt said operating position.

10. A harvesting machine according to claim 1 wherein said picking head includes a support assembly for carrying said banks of picking means said support assembly being operatively connected to the main frame, said support assembly comprising a plurality of support units at least one support unit being disposed on each side of the axis of the main frame, each said support unit comprising a backing member having a longitudinal axis and one or more carriers mounted on the backing member, each carrier having one of the banks of picking means secured thereto, said carriers being operatively connected to the backing member so as to be pivotable about an axis defining the longitudinal axis of the bank said axis extending generally parallel to the longitudinal axis of the backing member.

11. A harvesting machine according to claim 10 wherein said mounting members operatively connect said backing member to said main frame, said mounting members being L-shaped with a free end of one of the arms of each member projecting downwardly with the pivotal mounting for the backing member being disposed at the free end, and roller means on the other arm of the L-shaped member arranged so that it can move along the main frame so that the picking banks on either side of the main frame axis can be moved towards or away from each other.

* * * * *